United States Patent
Phillips et al.

(10) Patent No.: US 7,612,903 B2
(45) Date of Patent: Nov. 3, 2009

(54) LINE UTILIZATION IN INTEGRATED DOCUMENT DELIVERY METHOD AND APPARATUS

(75) Inventors: Kevin Phillips, San Jose, CA (US); Eric C. Chen, Fremont, CA (US); Curtis R. Powell, Pollock Pines, CA (US); Jian Chen, Morgan Hill, CA (US); Kamal Punn, Sunnyvale, CA (US)

(73) Assignee: Castelle, Morgan Hill, CA (US)

( * ) Notice: Subject to any disclaimer, the term of this patent is extended or adjusted under 35 U.S.C. 154(b) by 867 days.

(21) Appl. No.: 10/935,776

(22) Filed: Sep. 7, 2004

(65) Prior Publication Data

US 2005/0063005 A1 Mar. 24, 2005

Related U.S. Application Data

(60) Provisional application No. 60/501,238, filed on Sep. 8, 2003.

(51) Int. Cl.
*G06F 3/12* (2006.01)
(52) U.S. Cl. .................. 358/1.15; 358/426.08; 718/105
(58) Field of Classification Search .................. 709/220, 709/228; 714/4; 455/444; 358/1.15, 404, 358/426.08; 718/105
See application file for complete search history.

(56) References Cited

U.S. PATENT DOCUMENTS

| | | | | |
|---|---|---|---|---|
| 6,195,554 | B1 * | 2/2001 | H'mimy et al. | 455/450 |
| 6,961,410 | B1 * | 11/2005 | Castagna | 379/88.23 |
| 7,281,049 | B2 * | 10/2007 | Verma et al. | 709/228 |
| 2002/0073181 | A1 * | 6/2002 | Christensen | 709/220 |
| 2003/0177210 | A1 * | 9/2003 | Stringham | 709/228 |
| 2004/0153708 | A1 * | 8/2004 | Joshi et al. | 714/4 |
| 2004/0266439 | A1 * | 12/2004 | Lynch et al. | 455/444 |

* cited by examiner

*Primary Examiner*—Twyler L Haskins
*Assistant Examiner*—Nicholas C Pachol
(74) *Attorney, Agent, or Firm*—Perkins Coie LLP (57) ABSTRACT

A document delivery network server having a set of integrated functions including sending, receiving, routing and filing of FAXes and e-mails to other users which achieves numerous advantages over the prior art. The document delivery system is based on a client/server model having both analog and digital Fax line capabilities. The server side provides very highly integrated systems functionality based on industry standard, commercially available hardware and a mix of industry standard and proprietary software components including integrated FAX/modem modules, an embedded OS, embedded plug-and-play driver sets, embedded e-mail gateways, an embedded FAX archive, embedded backup/restore, proprietary high efficiency line utilization and highly efficient load balancing.

11 Claims, 5 Drawing Sheets

LINE UTILIZATION IN INTEGRATED DOCUMENT DELIVERY METHOD AND APPARATUS

This application claims the benefit of U.S. Provisional Application No. 60/501,238 filed on Sep. 8, 2003.

BACKGROUND OF THE INVENTION

1. Technical Field

This invention relates generally to electronic delivery of documents in a network environment, and more specifically to using a highly integrated plug-and-play system to deliver possibly differing types of documents over possibly differing types of electronic media to possibly differing types of target devices.

2. Discussion of Prior Art

Internet e-mail is suited for delivering various types of documents to a dispersed workforce, yet facsimile (FAX) continues to support a significant share of many business processes. Target devices ranging from full function computers to hand held Personal Digital Assistants (PDAs) and cell phones complicate communications. A user who needs to send one document to numerous recipients needs to know something about each of the target devices, which have their own conditions for the types of documents they can receive. Conventionally, these conditions are stored in the user's communication device and must be kept current by individual users, which is burdensome.

There exist several methods for separately sending different types of documents, but no current system can send diverse types of documents simultaneously. Moreover, no present system allows a user to send the same document simultaneously to different types of target devices. Conventional solutions require installation and integration of various hardware and software components such as a computer, fax modems, network interfaces, fax server software, e-mail server software, database and application interface code.

Current document delivery methods also restrict the format of documents that may be sent or received. For example, some systems can only send and receive Simple Mail Transfer Protocol (SMTP) documents, others only facsimile documents, and still others only graphical documents such as plot files or character delimited data. There are a number of current methods for analyzing an incoming document and converting it to a desired format before delivering it to a specific target device, but none have, from a single "plug-and-play" network device, the ability to simultaneously send the same document to multiple users with different target device types.

A further restriction on current methods is related to complexity. Providing document delivery service to multiple types of devices requires complex conversion processes that need to be loaded and run, which involves difficult initial installation and ongoing maintenance. Contemporary systems, when faced with new or changed input file types or target devices, do not have the ability to "plug-and-play."

What is needed is a system and method for delivering a plurality of document types to a variety of target devices without the need to assemble the appropriate hardware components or to manually install or maintain software drivers and software applications.

Current systems maintain an acceptable number of lines idle by setting lines to "Receive Only," "Send Only," or "Bi-Directional." It is common practice for Administrators to configure "Receive Only" lines as an assurance that they won't send a "busy" tone to incoming calls. This method does not allow a dynamic mix of send and receive jobs to fully utilize the lines and still maintain a dedicated number of lines idle for incoming calls. Instead, the administrator must predict and fix a static setting for the expected send and receive workload.

SUMMARY OF THE INVENTION

The present invention provides a document delivery network server which integrates functions preferably including sending, receiving, routing and filing of FAXes and e-mails to and from other users. The document delivery system is embodied in a client/server model having both analog and digital FAX line capabilities. The server side integrates conventional hardware with industry standard and proprietary software. The system's components include integrated FAX/modem modules, an embedded OS, embedded plug-and-play driver sets, embedded e-mail gateways, an embedded FAX archive, embedded back-up/restore, proprietary high efficiency line utilization and efficient load balancing.

Providing these components in a "Plug-n-Play" document delivery network server simplifies installation of hardware and software on the server side. Client side software installation is facilitated by offering many options for accessing the server. In the simplest "zero-install" case, a web browser can be used to access the document delivery server, and a word processor can be used as a cover page editor. Other access options include sending/receiving a plurality of documents through an e-mail gateway on the server, using regular application printouts with a proprietary FAX print driver to generate FAX jobs, copying files to a Drop Directory, and submitting jobs through an industry standard programming interface. Finally, a thick client can optionally be installed for a more fully featured interface to the document delivery server. The combination of a high level of functional integration, ease of installation and client flexibility provides a significant improvement over conventional solutions.

The document delivery server is preferably connectable to a plurality of delivery media including the Public Switched Telephone Network (PSTN), the Internet and one or more intranets including wired and wireless Local Area Networks (LANs) and Wide Area Networks (WANs).

The document server memory stores a set of software modules that provide functions including Queue Management, Document Conversion, FAX Scheduling, and a Document Delivery Database. These software modules work with an embedded operating system which includes a plurality of target device type drivers to enable a diverse set of users to simultaneously send and receive FAXes and e-mails.

In operation the document delivery server, which may or may not be in a remote location, receives input documents via network connections from users. For example, users may input documents of any file type via the Internet, the PSTN, an intranet or a wireless gateway. The invention examines the input, determines if the target device is compatible, if not, converts the document into a compatible format, and sends the document to the target device. The conversion process consists of rendering incoming files into multi-page Tagged Image File Format (TIFF) images for facsimile, a PDF (Portable Document Format) file for Internet viewing, or attaching the file to an e-mail.

The invention includes a method for better utilizing telephone facsimile lines and maintaining a configurable number of idle lines to service incoming calls. Rather than setting specific lines to "Receive Only" as current systems do, the invention frequently updates its count of idle lines. An outgoing send job is only allocated a line if there are more than a configurable minimum number of idle lines available. This simple algorithm allows a more dynamic mix of send and receive jobs to more fully utilize telephone FAX lines and still maintain a minimum number of lines idle to assure that incoming calls will be accepted rather than "busy-out."

Multiple document delivery servers can be clustered together to scale the capacity of managed facsimile lines and the number of supported simultaneous users. The cluster configuration is a master-slave arrangement that allows for fail-over scenarios in the event that a server is unavailable. The master tracks the usage of all lines in the cluster.

One advantage of the invention is its ability to send the same input document to different target devices simultaneously. For example, a user may have a text document that must be sent to a FAX machine for one recipient but via e-mail for others. The text document is rendered as a TIFF file for the FAX machine or sent as text through e-mail. Advantageously, the invention accepts the input document, formats it correctly for all recipients regardless of the target device type(s), and then distributes the document in one session. These and other advantages of the invention are described below in conjunction with the attached drawings.

DETAILED DESCRIPTION OF THE INVENTION

Figure 1:
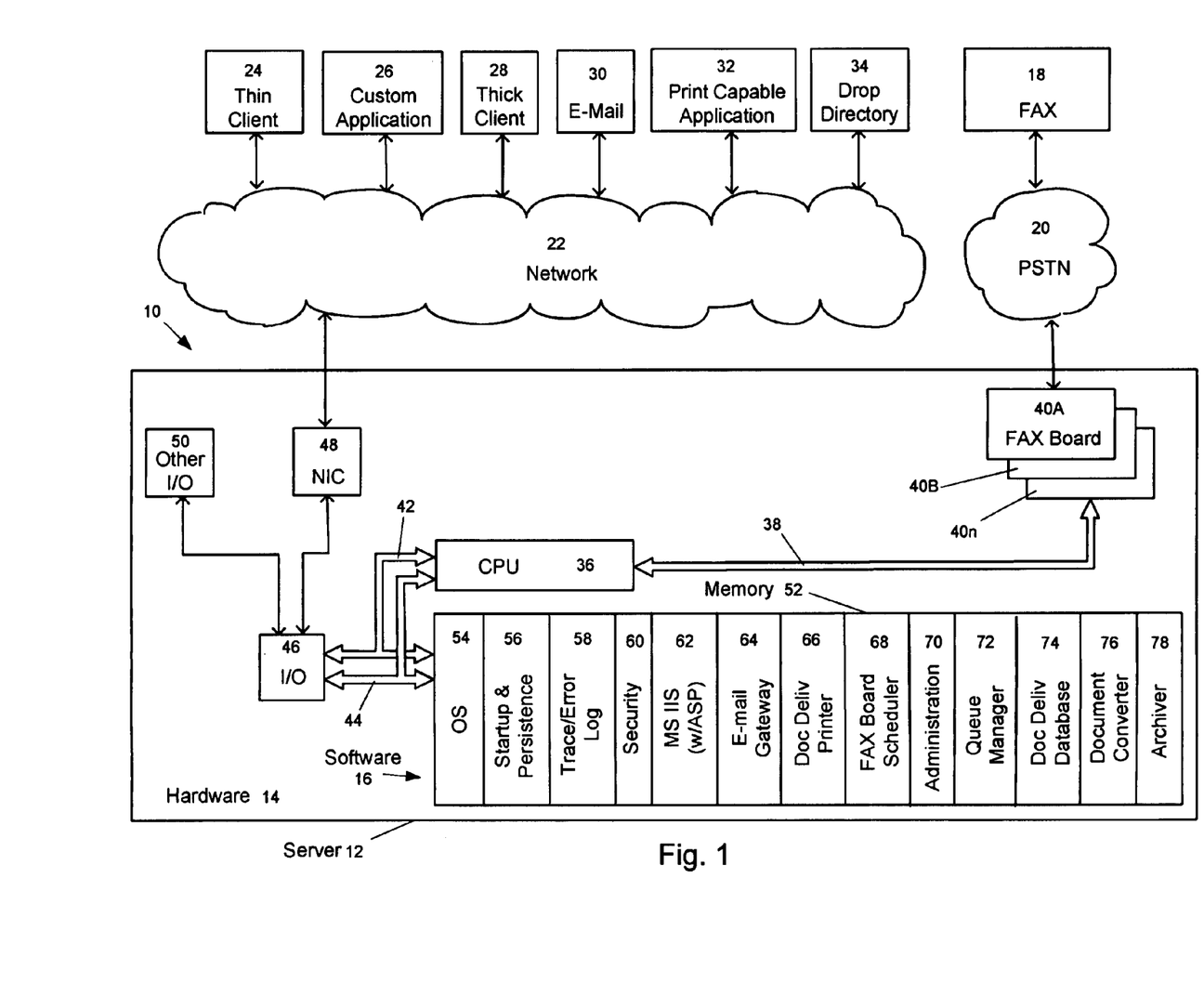
FIG. 1 is physical block diagram showing a document delivery system that may implement the method of the invention.

FIG. 1 is a physical block diagram of the document delivery system 10 of the present invention which is comprised of a Document Server 12 including hardware 14 and software 16. Server 12 communicates with numerous document sending and receiving devices including a conventional FAX machine 18 connected through the Public Switched Telephone Network (PSTN) 20, and various other types of devices connected through a network 22 for example the Internet or an intranet such as Local Area Network (LAN) or Wide Area Network (WAN). The various types of sending and receiving devices include a Web browser thin client 24, a User custom application 26, a Microsoft Foundation Classes (MFC) thick client 28, an E-mail server 30, any Windows® print-capable application 32, and a Drop directory 34. Additional target devices, for example a cell phone or PDA, are also contemplated.

Hardware 14 comprises a conventional CPU 36 connected by a PCI bus 38 to (a) FAX/modem board(s) 40A(, 40B . . . 40n) which are in turn connected to PSTN 20. In a preferred embodiment, the FAX/Modem board(s) 40A, 40B . . . 40n are CPi/2400-1T1 facsimile boards, each with twenty-four multiplexed channels, from Intel Corp., Santa Clara, Calif. Other types of board may be used.

CPU 36 is also connected through Address 42 and Data 44 busses and I/O circuits 46 to a Network Interface Controller (NIC) 48 and to other I/O Ports 50 interfacing to such I/O devices as monitors, keyboards and displays (not shown) typically used to communicate with the system, for example, to program it. Other conventional components of Server 12, for example a power supply and chassis, are not shown.

CPU 36 is also connected through Address 42 and Data 44 busses to a Memory 52 made up of Read Only Memory (ROM), Random Access Memory (RAM), and a long term mass storage device such as a hard disk drive, not shown. The ROM and RAM store instructions and data for booting the Operating System (OS), setting initial system variables and storing transient data generated by routine operations of CPU 36, while data files are stored on the hard disk.

The invention uses an embedded OS 54, preferably Windows® 2003 Server Application Kit (SAK) from Microsoft Corporation of Redmond, Wash. Using an embedded OS provides a number of advantages including ease of portability, ease of programming, ease of interface and a large population of device drivers. Selecting a Windows based OS enables the broadest coverage of applications (and thus supported file types) that can be installed on the server for server-side rendering or document conversion.

Startup/Persistence Manager module 56 manages the startup and shutdown of Document Server 12 and provides required basic operational services including timer management, clock/time-of-day management, and memory management to ensure the integrity of data and an orderly transition of pending tasks during power up and down sequences. The persistence manager monitors and restarts hung or crashed services to improve availability of the document delivery services. These tasks are accomplished in a manner well known in the art.

Trace/Error Log module 58 tracks, and if possible assists in correcting, error conditions related to operation of Document Server 12. For example, if a document was to be delivered to a particular target device, but that device was unavailable to receive, then after a predetermined number of attempts a "failure to deliver" error would be declared. Data associated with the error is then written to a log for later analysis. Other error conditions are handled in a similar manner.

Networked systems are susceptible to attack, and therefore certain security activities, for example, authentication, authorization, accounting, audit trails, and public key encryption, are required to ensure a high level of task/data integrity. Security module 60 contains instructions necessary to interpret and act upon tasks and data related to operating Document Server 12, and uses data contained in the Document Delivery Database 74 as well as specific data generated by other functions within the system to monitor for, asses, and inform the system of, security threats.

Operating System 54, Startup/Persistence Manager module 56, Trace/Error Log module 58, and Security module 60 operate in the background and interact with other modules that make up the software 16 of Document Server 12.

In addition to the conventional general software/firmware components required by CPU 36, memory 52 stores a number of specific purpose software function program modules.

Microsoft Internet Information Server (IIS™) with an Active Server Page (ASP) 62 is a standard Web Server. It is programmed with specific purpose ASP pages that provide the thin client Web Browser Interface 80 to the document delivery server. The specific purpose WSDL and SOAP files 86 provide a Web Services programming Interface to the document delivery server.

An e-mail Gateway module 64 accepts incoming documents as MIME attachments from networked e-mail servers including SMTP, Notes™, or Exchange™ represented as E-mail Server 30.

A Document Delivery Printer module 66 accepts incoming documents from any application that is compatible with the Windows® Graphical Device Interface (GDI) and is capable of printing.

A FAX Board Scheduler module 68 determines and manages which of the channels in the several FAX/modem Boards 40 should be used for a particular document transaction.

An Administration module 70 manages the document delivery server configuration and user tables. The user tables include a mapping of fax numbers and email addresses for the routing of incoming jobs to users in the system.

A Queue Manager module 72 manages both the incoming and outgoing document queues.

A Document Delivery Database module 74 contains a number of tables for configuration of the document delivery server, user settings, incoming, outgoing, archival, and notice queues.

A Document Converter module 76 converts files in job groups to the set of file formats required by all destinations in the job group. For each type of input file, the associated application with the file type (for example MS Word for .doc files) is launched and a print command is issued to the document delivery printer that outputs appropriate file types for the target device. For example, the printer may output faxable TIFF files for a FAX target device or PDF files for a PDA device.

An Archiver module 78 creates and maintains a backup of documents processed by Document Server 12. It may connect to any ODBC compliant database and Windows UNC networked mapped directory to store backups of the document delivery server jobs.

Operation

Figure 2:
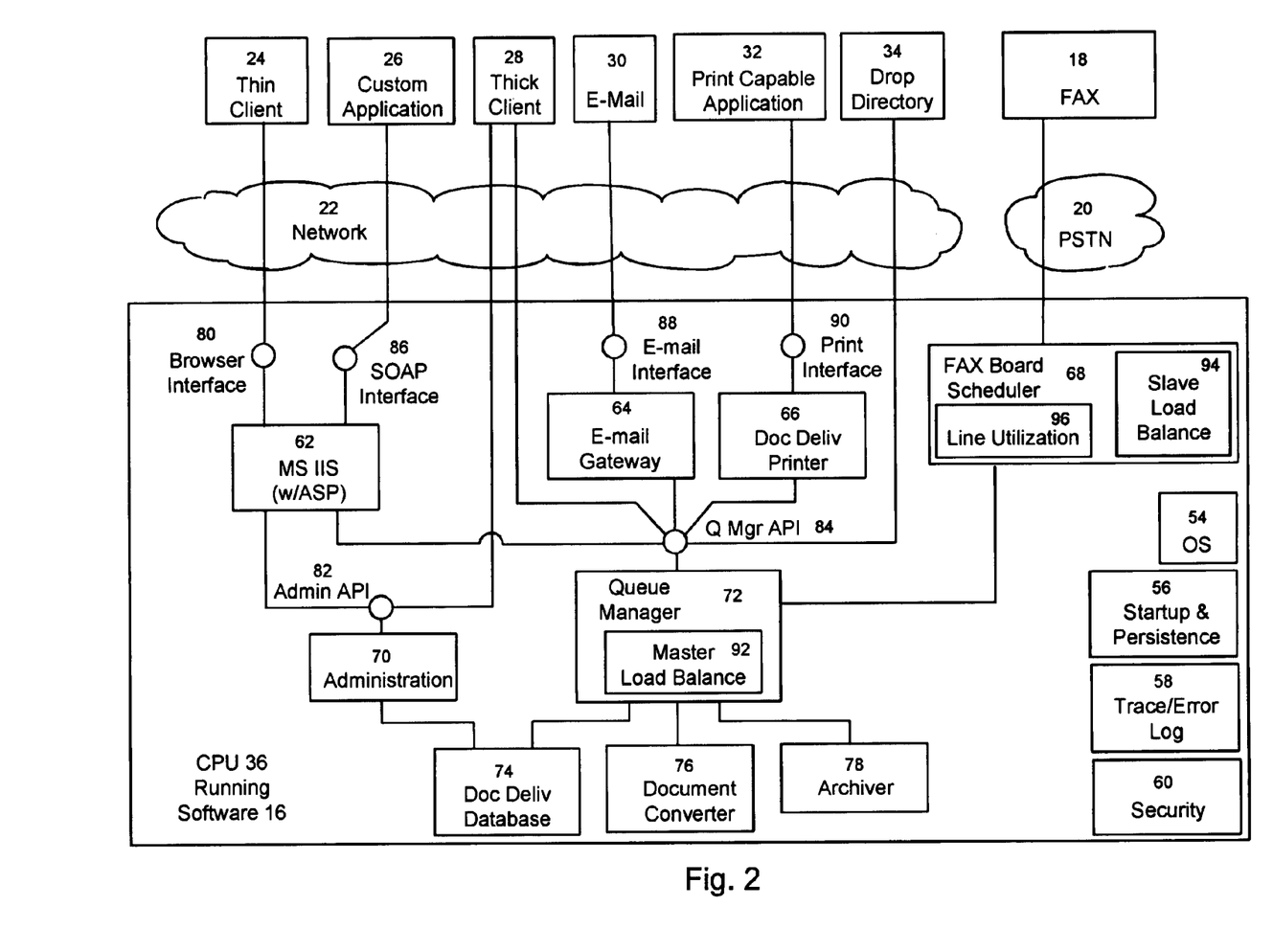
FIG. 2 is a logical block diagram showing software modules involved in communicating with various sending and receiving devices.

FIG. 2 is a logical block diagram showing relationships between software modules involved in processing communications between various sending and receiving devices.

Document server 12 may be accessed in multiple ways. A first path into Document Server 12 is via a web browser interface 24. This is referred to as a "thin client" or "zero install" method since no dedicated software need be loaded, and no software other than a web browser is required, on the user's system. A user sends a document via the Web Browser Thin Client 24 to Document Server 12 for delivery to a receiver. Since web browsers use the standard HTTP transport, and since the software of the Document Server 12 can receive documents of any registered file type, users may simply use their web browsers to send documents for delivery. The document sent by the user transits network 22 and arrives at NIC 48 in Document Server 12. Web Browser Interface program 80 is part of the Microsoft Internet Information Server (IIS™) 62 which in turn is bundled with the Windows 2000® OS 54. The document is passed to an Active Server Page (ASP) within the IIS 62 which in response generates HTML code. ASP IIS 62 passes the document via Queue Manager Application Program Interface (API) 84 to Queue Manager module 72. The Queue Manager module 72 operates upon the incoming document to retrieve and analyze data fields. These data are used in cooperation with Document Delivery Database 74 to verify the user's sender information and determine what if any document conversion is required, and schedule the outgoing document. Once scheduled, the document is placed in the outgoing queue where it will be transmitted as described below.

A second path into Document Server 12 is through a User Custom Application 26, which is identical to the thin client case except that the user must write Custom Application 26, which can be in any language as long as the interface is Simple Object Access Protocol (SOAP) compliant. The SOAP-compliant application program must reside on the user's system. Soap interface 86 accepts SOAP messages over the HTTP transport protocol for further processing by MS IIS 62.

A third path into Document Server 12 is via an MFC application 28, a so-called "thick client," running on a user's system. For this method a dedicated interface application resides on the user's system (not shown). The interface application is specifically written to interface with the Admin API 82 and the Queue Manager API 84 software. The interface application enables incoming documents to be presented directly via Queue Manager API 84 to the Queue Manager module 72. Operations upon the incoming document are the same as for the zero install case.

Other inputs originating from web browser thin client 24, user custom application 26 and MFC thick client 28 are routed through Admin API 82 to the Administration Manager which manages the document delivery server's configuration, user accounts, routing tables, fax line allocation, and other custom settings.

A fourth path for a document to be delivered to Document Server 12 is by e-mail using conventional protocols such as Simple Mail Transfer Protocol (SMTP), Lotus™ Notes™, or Microsoft Exchange™. Other e-mail protocols could be used as well. A sender's e-mail server 30 delivers an e-mail document via a network 22 such as the Internet to e-mail interface 88, which passes the incoming document to e-mail gateway module 64, which is capable of receiving, analyzing and acting upon incoming documents in a variety of formats. E-mail Gateway module 64 operates in a manner well understood in the art. E-mail gateway module 64 in turn sends the received document to Queue Manager module 72 for further handling.

A fifth path for a document to be delivered to Document Server 12 is from any Windows® Print Capable Application 32 such as Microsoft Word® which can format a document in a Graphical Device Interface (GDI) (bitmapped) file. The incoming document is received via Printer Interface 90 and passed to the Document Delivery Printer module 66 which extracts tag delimited commands embedded within the document text and parses the commands to evaluate such data as the source, destination, and delivery options, among other information. Printer module 66 converts the incoming document to a Tagged Image File Format (TIFF) format and passes it to Queue Manager 72 for further handling. Queue Manager 72 uses data retrieved from the embedded commands to look up target information contained in Document Delivery Database 74.

A sixth path into Document Server 12 is by way of a Drop Directory 34, which is a location in a sender's computer where a user may simply "drop" a file containing metadata about a delivery job. The metadata file may contain references to multiple documents also copied to the drop directory which will be included as the body of the delivery job. More than one (not shown) drop directory may be present. Queue Manager 72 continuously polls or checks the drop directory 34 to see if a new metadata job file or job group has appeared. If so Queue Manager 72 retrieves the job file, determines what actions are necessary from data fields contained within the document(s), and acts upon the document(s) as required.

Inputs originating from web browser thin client 24, user custom application 26, MFC thick client 28, E-mail server 30, Windows print-capable application 32, and Drop directory 34 are routed through Queue Manager API 84. The Queue Manager 72 schedules conversion for all documents to all required destination file formats. Cover pages may be rendered individually for each job or destination in the job group, where attachments will only be rendered once per job group per target file type. After conversion, Queue manager 72 checks "Castelle Internet Faxing" (CIF) routing tables to see if a job belongs in the local global job queue or needs to be forwarded to another master Queue Manager 72 on a document delivery server 12 in a different location. Once in the Global Ready Job Queue, and the delivery time has passed the job is available to the Fax Schedulers in the cluster on a FIFO basis.

A user may send a document on a seventh path from a traditional FAX machine 18 via PSTN 20 and through a FAX/modem interface board 40 and FAX Scheduler module 68. FAX Board Scheduler module 68 receives instructions from, and passes received FAXes to, Queue Manager module 72. Since the received document is already in a proper (TIFF) format for handling, Queue Manager module 72 is able to process the incoming document without a conversion step.

These seven input paths are not the only possible methods of document submission using this invention. Other input paths may be used without departing from the method of the invention.

Queue Manager module 72 generates and maintains the data contained in the Document Delivery Database module 74, and works with Document Delivery Database module 74 and Document Converter module 76 to ensure that a specific document is properly formatted and delivered to the appropriate user. For example, when an incoming document is received from E-mail Server 30 and destined for a Target Device 18 or 30, Document Conversion module 76 uses the data contained in Document Delivery Database 74 to first determine whether the particular target device needs the document formatted for transmission and, if so, converts the document to the proper format. Queue Manager module 72 also operates in conjunction with Archiver module 78 and implements the invention's unique load balancing algorithm. Archiver module 78 is a scheduled task that backs up all transactions for a given period of time. Since this is a scheduled task, for example, every 24 hours at midnight, a run time may be selected that has the least impact on ordinary traffic. Archiver module 78 accomplishes the back-up task in a well known manner. While Archiver module 78 is resident on Document Server 12, the actual storage of data may be either local or remote.

Once a document has been received by Document Server 12, software 16 interprets incoming documents, determines what actions are required, identifies the target device(s) for the document(s), if necessary converts the incoming document to the format expected by the target device, performs the action(s) and deliver the document(s) to the indicated addressees are destinations for documents processed by Document Server 12. The Target Devices 18 and 30 may differ from each other.

Queue Manager module 72 stores the incoming and outgoing documents as files in queues in the Database 74 on the Document Delivery Server's hard disk (not shown). An incoming queue record includes identification fields for job number, user ID, origination ID as well as communication status and capability such as receive status, resolution, time, duration, baud rate, signal conditions such as noise and strength, page count and direct inward dialing data. Other fields may also be used.

An outgoing queue record includes identification data, outgoing queue data, document data, transmission channel data, and target device data. Identification data includes job ID, originating job ID and user ID. Outgoing queue data comprises queue status prior to any required document conversion, queue status after any required document conversion, job priority, job group ID if the document is part of a group job, and cover page data. Document data includes, among other fields, a file path, transmission type, number of pages to be sent, completed transmission attempts, timeout data, transmission attempt scheduling, number of pages sent and any error codes reported.

Transmission channel data includes such fields as line noise level, signal quality, signal strength, baud rate capability, baud rate used for transmission, and target device capabilities. Target device data is comprised of, among other fields, one or more user keys, sender's name, a comment field, a company name field, time the transmission actually started, sent resolution, number of transmission attempts, the retry delay, certain customer accounting data for billing, a telephone line number, telephone line group number, the target number to be dialed and the actual number dialed. There are a number of other data fields in the transmission channel data that are not presented since they do not directly impinge on the method of the invention.

Once an incoming document has been received and any initial processing has been completed, for example parsing embedded commands in the Document Delivery Printer module 66, all documents are converted to the appropriate target destination format and henceforth processed in the same way. For example, if a sender has placed a file in their Drop Directory 34 and the document has been received, then a job number is assigned and target data collected and analyzed by Queue Manager module 72 cooperating with Administration module 70. Data contained in the Document Database module 74 is used to identify sender and receiver, determine if the incoming file requires conversion for any of the designated target devices, and verify any security requirements. If the incoming document requires conversion for any of the target devices, the Queue Manager module 72 instructs the Document Converter module 76 to process the document.

An advantage of the invention is that a single incoming document may be delivered to a plurality of target devices simultaneously. Queue Manager module 72 instructs the Document Converter module 76 to produce a converted document for each target device. As a result, a single incoming document can yield multiple outgoing jobs, each with their particular document format requirement. The multiple jobs (one for each destination) become members of a single job group.

If the incoming document requires only a single outgoing job, which is a FAX job, then Queue Manager module 72 assembles the job and passes the outgoing document to the FAX Board Scheduler module 68 which, obeying line use and load balancing rules discussed below, analyzes the job, sets outgoing communication session characteristics such as baud rate, resolution and the like, and ultimately prompts the FAX Board Driver module 40($n$) to dial the number initiating the outgoing transmission. The reference designator 40($n$) indicates that there may be more than one instance of a FAX board in Document Server 12. The FAX Board Driver 40($n$) establishes a connection with the target device, in this case traditional FAX machine 18, and transacts the delivery, thereby completing the process. In this way the invention can receive one or more documents from a plurality of sources, analyze, process and deliver the one or more incoming documents to one or more target devices in a format capable of being used by the one or more target devices even if the format requirements of the target devices differ.

If the target device is local then the number dialed on PSTN 20 is not a long distance call. However, document transmissions can be very large in size and if the call is long distance it can be expensive. Therefore the invention preferably reduces that expense by using the less expensive Internet to pass the document to a remote location and then distribute the document via a local PSTN call to the ultimate target device. This process is denominated Castelle Internet Faxing (CIF), which requires multiple instances of Document Server 12—one at each end. For example a company may have an office in Morgan Hill, Calif. and an office in New York, N.Y. Rather than use traditional FAX-to-FAX delivery over long distance PSTN lines, the company can install a Document Server 12 in both offices. A user in the New York office inputs a document, using any of the input cases described above, for several target devices in the Morgan Hill area. Document Server 12 in New York prepares the necessary documents, assembles the outgoing job and, using the proprietary CIF software over the more economical Internet communications medium, passes the entire job to Document Server 12 in Morgan Hill. Document Server 12 in Morgan Hill receives the job via NIC 48. Since the same CIF software is resident on both servers, Document Server 12 in Morgan Hill simply processes the job as if it had originated locally. Documents destined for each designated target device have already been formatted, thus the server in Morgan Hill simply delivers the documents as it had processed the entire job locally. In this way the method of the invention provides a more economic method for simultaneously delivering properly formatted documents to a plurality of remote target devices.

Load Balancing

Figure 3:
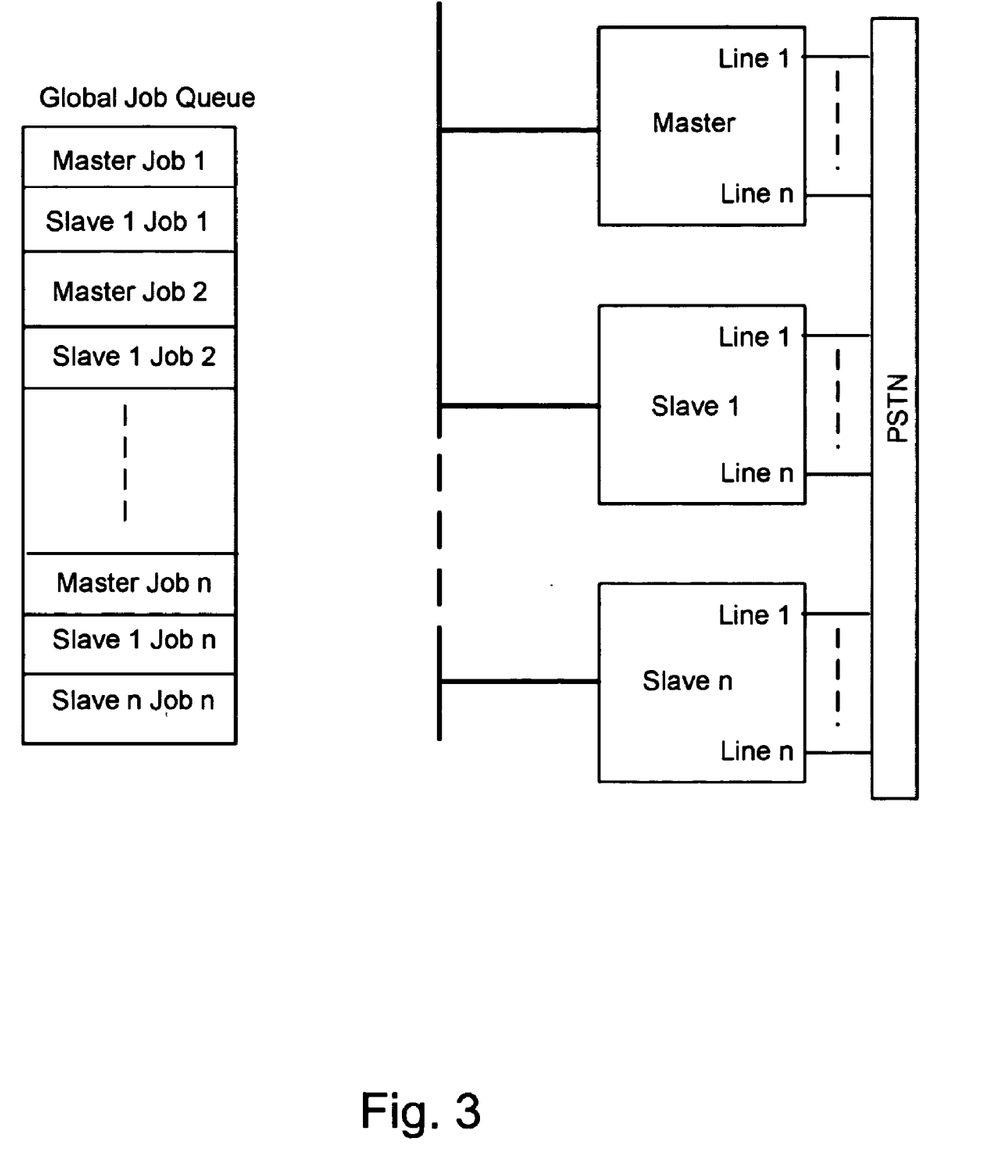
FIG. 3 is a block diagram illustrating a global job queue and a plurality of Document Servers 12 arranged as a master and slaves for performing line utilization and load balancing.

Multiple Document Delivery servers 12 may be clustered together in a Master/Slave(s) configuration. Each Slave is responsible only for the FAX lines connected to its respective slave node. The Master keeps track of the FAX lines connected to its own lines, and also tracks the status of each of the slave node lines and jobs. The entire set of lines for the master and all the slaves are presented as one set of "Virtual" lines to the clients of the Document Delivery Server Queue Manager clients. If three nodes have 48 lines each, the 144 physical lines are presented as one set of "Virtual" lines to all the client interfaces into the Master Document Delivery server.

The Master Document Delivery server runs all the software services in FIG. 2, where the Slave Document Delivery Server really only runs the FAX Scheduler service and Document Conversion services as slaves (clients) to the Master Document Delivery server's Queue Manager service.

Each FAX board Scheduler 68 on each node is responsible for maintaining an array of jobs ready to be sent. The size of the array is twice the number of lines on the node. This size assures that there will always be jobs "Ready" to be sent when a line is available. When a send job completes, the status (successful, busy tone, . . . ) is sent the Master Queue Manager, and the job is deleted from the local cache of "Ready" send jobs.

A thread in the FAX Board Scheduler 68 keeps the local cache of "Ready" send jobs full by requesting more jobs from the Master Queue Manager when there are empty slots in the local array. The Master just responds to requests from Slaves for "Ready" jobs. When responding to a request, the Master Queue Manager notes which slave has been assigned the jobs and will not allow the jobs to be assigned to multiple Slaves. Other load balancing schemes often try complex scheduling algorithms on a Master, but that creates a bottleneck on performance of the entire cluster in the Master Queue Manager. The distributed nature of this request/response architecture allows for efficient scaling out of the load, while presenting a unified view of the entire cluster's physical lines to users of the cluster.

Line Utilization

Figure 4:
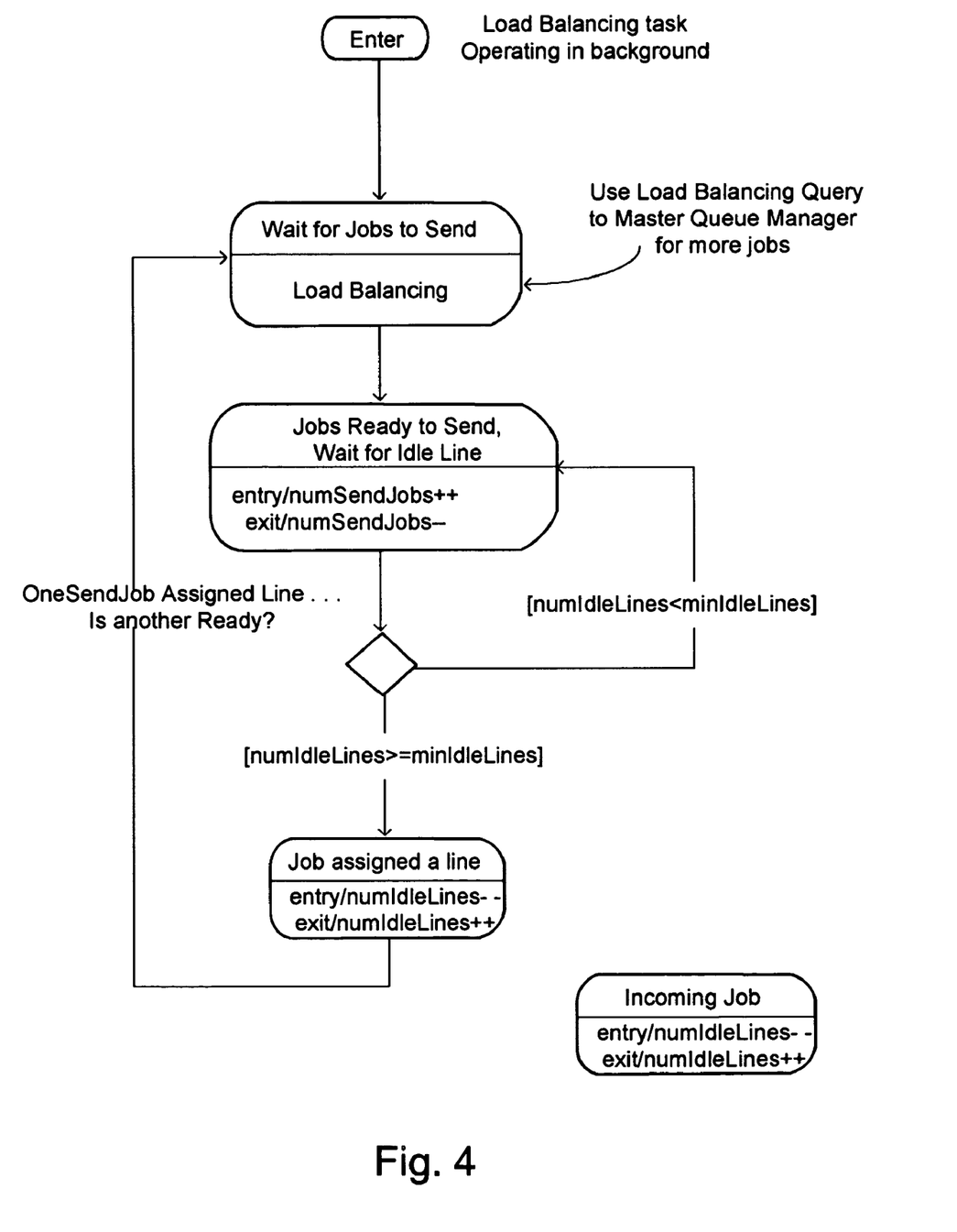
FIG. 4 is a state diagram of the algorithm for performing line utilization.
Figure 5:
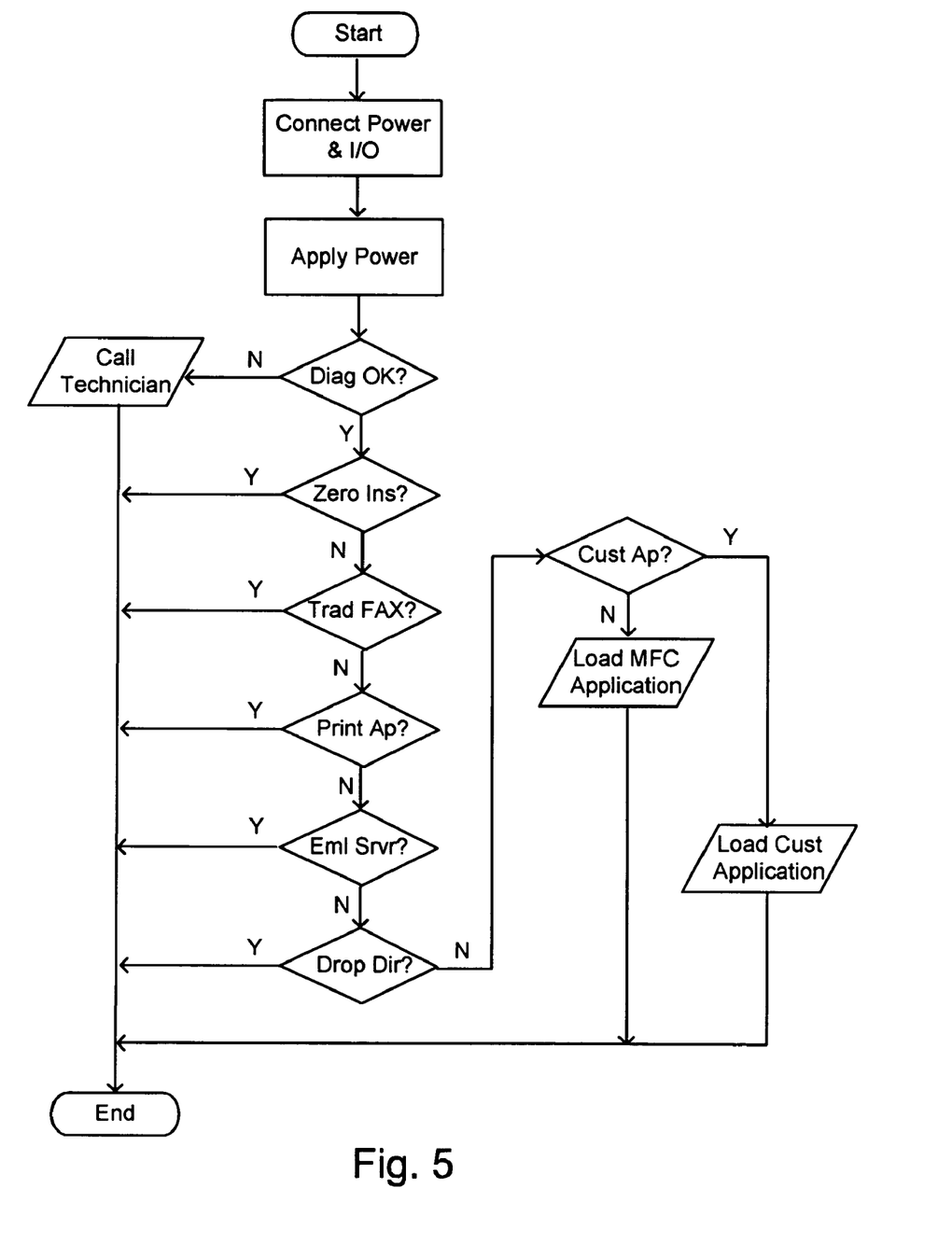
FIG. 5 is a flow chart illustrating a plug-and-play sequence for setting up the invention.

Line utilization occurs independently of load balancing. Once a FAX Scheduler has acquired a number of send jobs equal to 2× the number of lines it is scheduling for, the Line Utilization algorithms determine how to assign those jobs to a particular line.

Current systems maintain an acceptable number of idle lines by setting lines to "Receive Only", "Send Only", or "Bi-Directional". It is common practice for Administrators to configure "Receive Only" lines as an assurance that they won't send a "busy" tone to incoming calls. This method does not allow a dynamic mix of send and receive jobs to fully utilize the lines and still maintain a dedicated number of idle lines for incoming calls. The administrator must predict a static setting for the expected send and receive workload. The invention's novel Line Utilization algorithm (numIdleLines>minIdleLines) defines when a line is available for send jobs. If a line is available, one of the jobs in the local send "Ready" array is assigned a line by the node's FAX Scheduler 68. This allows all lines to be set to "Bi-Directional" and a dynamic mix of send and receive jobs to be scheduled on the system while still maintaining a threshold of available lines reserved for incoming jobs that avoids sending a busy signal.

Any given Document Server 12 may contain a plurality of FAX boards 40 connected to PSTN 20, and each FAX board 40 may contain as many as 30 separate channels. Since incoming documents may be arriving at any time, and since outgoing documents occupy channel space, the invention provides a line utilization method for ensuring that both incoming and outgoing activities may occur simultaneously. The FAXpress™ system administrator can reserve a default minimum number of channels (minIdleLines, FIG. 4) for incoming documents. This insures that Document Server 12 will always be able to receive jobs. Consider that at some arbitrary point in time an incremental incoming job arrives. For this example, assume that there are 24 channels total available for use, and that 12 of these are sending traffic and 11 are receiving traffic. Assume further that the system administrator has reserved a minimum of three lines (minIdleLines=3 in FIG. 4) to be for incoming traffic. Since one channel remains open, and since three is the minimum for receiving, the last open channel is reserved for an incremental incoming job. On the other hand, if three more receive jobs finish, there would now be 12 sending lines and 8 receiving lines with 4 idle lines. Because minIdleLines (3)<numIdleLines (4), a send job is allocated to a line and there would now be 13 send jobs and 8 receive jobs.

Re-capping Advantages

One advantage of the invention is the ability to deliver a single source document in multiple formats to multiple destinations simultaneously. This is accomplished by analyzing the incoming document to determine what target devices are intended, then operating upon the incoming document to create separate, properly formatted documents for each of the target devices. Once created, the documents are grouped as a job and simultaneously transmitted to all target devices.

A second advantage of the invention is enabling the economic use of transmission media. This is accomplished through both line utilization and load balancing. Line utilization occurs within each instance of a document server, while load balancing occurs over a cluster of master/slaved configured document servers 12. The result is the physically and economically optimized use of document delivery resources.

A third advantage of the invention is level of integration of document delivery functions. This is accomplished by providing a plug-and-play solution where all necessary hardware and software are provided in a single, easily installed digital device. Users of the document server simply attach the server 12 to a source of power, insert PSTN 20 and network 22 connections, and turn the server on. A system administrator then sets initial preferences, such as minimum number of incoming channels, and the server is ready for use.

A fourth advantage of the invention is flexibility. A wide range of input paths may be used to simultaneously deliver a document to a plurality of target devices even though each of the designated target devices may require different formats. Users of the system may make use of document delivery without the need to install any dedicated software via a web browser interface. At the other end of the input spectrum, legacy devices such as traditional FAX machines may be used to input documents.

While the present invention is described in terms of a preferred embodiment, it will be appreciated by those skilled in the art that this embodiment may be modified without departing from the essence of the invention. It is therefore intended that the following claims be interpreted as covering any modifications falling within the true spirit and scope of the invention.

We claim:

1. A method of utilizing communication channels in a document delivery system for receiving, converting and sending multiple types of documents, said system including one or more FAX/modem boards, comprising the steps of:
   determining how many FAX communication channels are available on said one or more FAX/modem boards for transacting document delivery tasks;
   setting a predetermined minimum number of said FAX communication channels for receiving documents;
   tracking a current number of incoming and outgoing tasks to be processed by said document delivery system, and
   assigning said current number of outgoing tasks across the total number of said FAX communication channels available such that said predetermined number of FAX communication channels for receiving documents remains available.

2. The method of claim 1 where the total available FAX communication channels is twenty-four and the predetermined minimum number of FAX channels for receiving is three.

3. The method of claim 1 wherein said step of assigning assigns said current number of incoming and outgoing tasks across the total number of said FAX communication channels available such that, besides said predetermined number of FAX communication channels for receiving documents remaining available, in addition each of the remaining said one or more FAX/Modem boards processes approximately equal numbers of document delivery tasks.

4. A document delivery system for receiving, converting and sending multiple types of documents, and for utilizing a plurality of FAX communication channels, comprising:
   one or more FAX/modem boards each capable of supporting a plurality of FAX communication channels;
   means for determining bow many FAX communication channels are available on said one or more FAX/modem boards for transacting document delivery tasks;
   means for setting a predetermined minimum number of said FAX communication channels for receiving documents;
   means for tracking a current number of incoming and outgoing tasks to be processed by said document delivery system; and
   means for assigning said current number of outgoing tasks across the total number of said FAX communication channels available such that said predetermined number of FAX communication channels for receiving documents remains available.

5. The system of claim 4 further comprising:
   a server including a hardware portion and a software portion and having one or more connections to a network, and
   wherein upon the application of power to said server, said software portion initializes said hardware portion to establish communications through said network connections and to perform document delivery tasks without the need for operator intervention.

6. The system of claim 5 wherein said hardware portion comprises:
   a central processor unit;
   a memory;
   a plurality of input/output circuits; and
   a network interface controller.

7. The system of claim 5 wherein said software portion comprises:
   an embedded operating system;
   a startup/persistence manager module;
   a trace/error log module;
   a security module;
   a web server module;
   an e-mail gateway module;
   a document delivery printer module;
   a FAX board scheduler module;
   an administration module;
   a queue manager module;
   a document delivery database module;
   a document converter module; and
   an archiver module.

8. The system of claim 5 wherein said one or more network connections include a connection to the Internet and one or more connections to a public switched telephone network.

9. The system of claim 5 further comprising, coupled to said one or more network connections, a plurality of clients including:
   a web browser thin client;
   a custom application client;
   a thick client;
   an e-mail server client;
   a print capable application client;
   a drop directory client; and
   a FAX client.

10. The system of claim 5 further comprising interconnected multiple instances of said server forming a cluster such that a designated one of said servers acts as a master and the others of said servers act as slaves, said master managing a task queue for all of said interconnected servers.

11. A load balancing method running on the master in the system of claim 10, comprising the steps of:
   determining the total number of servers in said cluster;
   receiving pending task queue data from each slave within said cluster;
   tracking requests for pending tasks from each of said slaves within said cluster, said slaves issuing said requests when idle, and;
   delivering a group of said pending tasks to each of said slaves when said slaves issue said requests such that over time said slaves and said master each process substantially the same number of said pending tasks, and
   wherein said means for assigning assigns said current number of incoming and outgoing tasks across the total number of said FAX communication channels available such that, besides said predetermined number of FAX communication channels for receiving documents remaining available, in addition each of the remaining said one or more FAX/Modem hoards processes approximately equal numbers of document delivery tasks.

* * * * *